United States Patent [19]

Saito et al.

[11] 4,132,554

[45] Jan. 2, 1979

[54] METHOD FOR PRODUCING A SINTERED COMPACT OF BORON NITRIDE WITH HIGH DENSITY FORM

[75] Inventors: Shinroku Saito; Akira Sawaoka, both of Yokohama; Masatada Araki, Handa, all of Japan

[73] Assignee: Nippon Oil and Fats Co. Ltd., Japan

[21] Appl. No.: 836,723

[22] Filed: Sep. 26, 1977

[30] Foreign Application Priority Data

Sep. 30, 1976 [JP] Japan .................... 51-116491
Nov. 19, 1976 [JP] Japan .................... 51-139094

[51] Int. Cl.² ............................................... C04B 35/58
[52] U.S. Cl. .................................... 106/55; 51/307; 106/57; 106/73.3; 264/56; 423/266; 423/275; 423/290; 423/297
[58] Field of Search ................... 106/55, 57, 73.3; 423/275, 266, 290

[56] References Cited

U.S. PATENT DOCUMENTS 3,852,078 12/1974 Wakatsuki et al. ............... 106/55
3,876,751 4/1975 Alexeevsky et al. ............. 106/55

FOREIGN PATENT DOCUMENTS 49-44014 4/1974 Japan.

OTHER PUBLICATIONS

Tani, E. et al., "A Stability of Wurtzite Type Boron Nitride Under High Pressure", Japan J. Appl. Phsy., 14 No. 10, (1975), pp. 1605-1606.

Primary Examiner—Helen McCarthy
Attorney, Agent, or Firm—Stevens, Davis, Miller & Mosher

[57] ABSTRACT

A sintered compact of boron nitride with high density form having high oxidation resistance, water resistance, compressive strength and hardness can be obtained by sintering wurtzite-structured boron nitride together with a boride of titanium, zirconium or hafnium, or with mixtures thereof under a condition of high temperature and high pressure.

3 Claims, 3 Drawing Figures ic boron nitride and amorphous boron nitride. The crystalline boron nitride is further divided into high density boron nitride, which requires high pressure during its synthesis, and low density boron nitride, which does not require high pressure during its synthesis. The high density boron nitride includes wurtzite-structured boron nitride belonging to the hexagonal system and zincblende-structured boron nitride belonging to the cubic system. The low density boron nitride includes graphite-structured boron nitride belonging to the hexagonal system.

METHOD FOR PRODUCING A SINTERED COMPACT OF BORON NITRIDE WITH HIGH DENSITY FORM

BACKGROUND OF THE INVENTION (1) Field of the Invention

The present invention relates to a method of producing a sintered compact consisting mainly of high density boron nitride.

(2) Description of the Prior Art

Cutting and grinding materials having high hardness and toughness have been demanded with the progress of cutting and grinding technics. Diamond has hitherto been used as the cutting or grinding material, but diamond reacts with steel and is worn at the high-speed cutting and grinding. Therefore, the development of high density boron nitride having a high hardness, which hardly reacts with steel, becomes very important.

Boron nitride can be divided broadly into crystalline boron nitride and amorphous boron nitride. The crystalline boron nitride is further divided into high density boron nitride, which requires high pressure during its synthesis, and low density boron nitride, which does not require high pressure during its synthesis. The high density boron nitride includes wurtzite-structured boron nitride belonging to the hexagonal system and zincblende-structured boron nitride belonging to the cubic system. The low density boron nitride includes graphite-structured boron nitride belonging to the hexagonal system.

Wurtzite-structured boron nitride is a little lower in the hardness, but is higher in the compressive strength and toughness than zincblende-structured boron nitride.

When these high density boron nitrides are used as a cutting or grinding material, the boron nitrides are used in the form of a sintered compact of polycrystal. For example, in Japanese patent application publication No. 39,444/75 and No. 13,163/76 and Japanese Patent Laid Open Application No. 125,412/74 and No. 49,309/75, wurtzite-structured boron nitride is sintered at high temperature and under high pressure to obtain a sintered compact of polycrystal.

The stability of wurtzite-structured boron nitride under high temperature and high pressure is described in Japanese Journal of Applied Physics, Vol. 14, No. 10, pages 1605–1606 (1975). Wurtzite-structured boron nitride is stable within a range of lower than about 1,300° C and not lower than 55 Kb. Therefore, wurtzite-structured boron nitride can be sintered within this range without losing the wurtzite structure. But, even when the sintered compact is apparently good, a small number of interstices still remain among the crystal particles, and the sintered compact is broken by a low load. Wurtzite-structured boron nitride is partly or wholly converted into zincblende-structured boron nitride under a temperature-pressure condition of not lower than 1,300° C and not lower than 55 Kb. Further, the Japanese Journal of Applied Physics, Vol. 14, No. 10, pages 1605–1606 discloses that wurtzite-structured boron nitride is wholly converted into zincblende-structured boron nitride under a temperature-pressure condition of higher than 1,650° C and higher than 60 Kb. Therefore, excellent sintered compacts of high density boron nitride having characteristic properties of wurtzite-structured boron nitride have not yet been obtained.

Further, boron nitride is oxidized to form boric acid anhydride $B_2O_3$, although the amount is very small. Boric acid anhydride has a low melting point, and the presence of the anhydride in the sintered compact of boron nitride results in decreasing the performances of the sintered compact in use as a cutting tool or grinding tool, whose operating parts will have an elevated temperature. Therefore, the formation of boric acid anhydride is not desirable.

The inventors have found out that, when powdery wurtzite-structured boron nitride is sintered together with a boride of titanium, hafnium or zirconium or with a mixture thereof, the conversion of wurtzite structure to zincblende structure can be suppressed even under a temperature-pressure condition of not lower than 1,300° C and not lower than 55 Kb, and a sintered compact of boron nitride having high hardness, compressive strength and oxidation resistance can be obtained.

SUMMARY OF THE INVENTION

An object of the present invention is to provide a method of producing a crack-free sintered compact consisting mainly of high density boron nitride, which has high hardness, oxidation resistance and compressive strength.

Another object of the present invention is to provide a method of producing a sintered compact consisting mainly of high density boron nitride, which has high oxidation resistance, water resistance and compressive strength and further has a remarkably high hardness.

The first aspect of the present invention consists in a method for producing a sintered compact consisting mainly of high density boron nitride having wurtzite structure, comprising sintering a mixture of wurtzite-structured boron nitride and at least one of titanium boride, zirconium boride and hafnium boride, the amount of the boride being 2–35% by weight based on the total amount of the boride and the boron nitride, for 1–60 minutes under a temperature-pressure condition within a parallelogram formed by connecting points A (1,400° C, 80 Kb), B (1,300° C, 55 Kb), C (1,650° C, 55 Kb) and D (1,750° C, 80 Kb) in a temperature-pressure diagram.

The second aspect of the present invention consists in a method for producing a sintered compact consisting mainly of high density boron nitride having both wurtzite structure and zincblende structure, comprising sintering a mixture of wurtzite-structured boron nitride and at least one of titanium boride, zirconium boride and hafnium boride, the amount of the boride being 2–35% by weight based on the total amount of the boride and the boron nitride, for 1–60 minutes under a temperature-pressure condition within a parallelogram formed by connecting points E (1,770° C, 80 Kb), F (1,700° C, 62, Kb), G (1,980° C, 62 Kb) and H (2,050° C, 80 Kb) in a temperature-pressure diagram.

DESCRIPTION OF THE PREFERRED EMBODIMENTS

Figure 1:
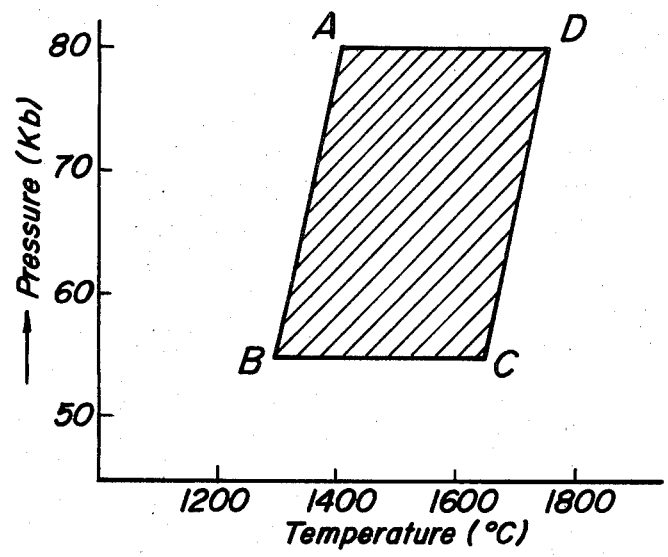
FIG. 1 is a temperature-pressure diagram, whose hatched portion shows the temperature-pressure condition effective for the production of a sintered compact consisting mainly of high density boron nitride with wurtzite structure according to the present invention.

In the first aspect of the present invention, a mixture of wurtzite-structured boron nitride and at least one of titanium boride, zirconium boride and hafnium boride is sintered for 1–60 minutes under a temperature-pressure condition within a parallelogram formed by connecting points A (1,400° C, 80 Kb), B (1,300° C, 55 Kb), C (1,650° C, 55 Kb) and D (1,750° C, 80 Kb) in the temperature-pressure diagram shown in FIG. 1. Under such sintering condition, wurtzite-structured boron nitride is sintered without losing wurtzite structure, and a sintered compact having high hardness, oxidation resistance and compressive strength can be obtained. The sintered compact, due to its high compressive strength, is particularly suitable for cutting metals having a rough surface. However, when metals having a higher hardness are cut, it is preferable to use a sintered compact of boron nitride having a higher hardness. The inventors have further investigated and found that, when a mixture of wurtzite-structured boron nitride and the above described boride is sintered at a temperature higher than the temperature of the above described temperature-pressure condition, wurtzite-structured boron nitride is partly converted into zincblende-structured boron nitride, and a sintered compact having a remarkably high hardness, which consists mainly of a mixture of wurtzite-structured boron nitride and zincblende-structured boron nitride in a wide mixing ratio, can be obtained. This is the second aspect of the present invention.

Figure 2:
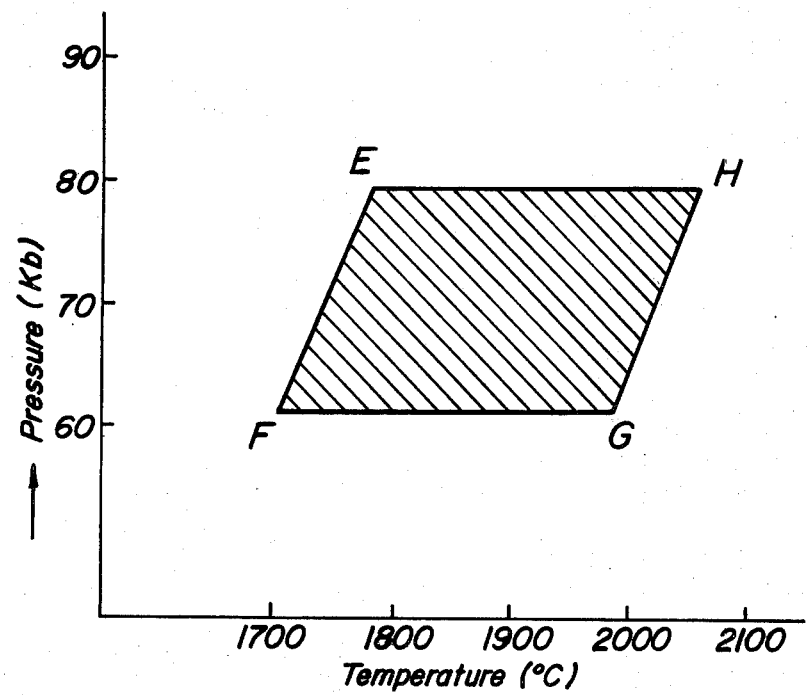
FIG. 2 is a temperature-pressure diagram, whose hatched portion shows the temperature-pressure condition effective for the production of a sintered compact consisting mainly of high density boron nitride with both wurtzite structure and zincblende structure according to the present invention.

That is, in the second aspect of the present invention, a mixture of wurtzite-structured boron nitride and at least one of titanium boride, zirconium boride and hafnium boride is sintered for 1–60 minutes under a temperature-pressure condition within a parallelogram formed by connecting points E (1,770° C, 80 Kb), F (1,700° C, 62 Kb), G (1,980° C, 62 Kb) and H (2,050° C, 80 Kb) in the temperature-pressure diagram shown in FIG. 2.

The resulting sintered compact consisting mainly of boron nitride with both wurtzite structure and zincblende structure has very excellent properties, that is, has not only merits of both crystal structures but also high toughness and oxidation resistance. Because the sintered compact is produced by the sintering under high temperature and high pressure, the number of interstices in the sintered compact is very small.

The wurtzite-structured boron nitride to be used as a starting material in the present invention may be any wurtzite-structured boron nitrides obtained by converting low density boron nitride or amorphous boron nitride into the wurtzite-structured boron nitride by the shock compression method or under a static super high pressure.

There is described in Japanese Patent Laid Open Application No. 44,014/74 that a sintered compact of wurtzite-structured boron nitride is obtained by sintering a mixture of wurtzite-structured boron nitride and at least one compound selected from the group consisting of borides of Al, Si and metals of the groups of 4a, 5a and 6b in the Periodic Table and other compounds under a temperature and pressure condition, under which wurtzite-structured boron nitride is stable. While, in the present invention, wurtzite-structured boron nitride is sintered under a high temperature and high pressure condition, under which wurtzite-structured boron nitride is unstable. Therefore, the present invention is entirely different from the Japanese Patent Laid Open Application No. 44,014/74 in the temperature and pressure condition. Moreover, in the Japanese laid open application, borides of titanium, zirconium and hafnium are used as a ceramic material for the production of polycrystals having a large surface area, while in the present invention, these borides are used in order to suppress the conversion of the crystal phase of boron nitride. Therefore, the present invention is also different in the action of these borides from the Japanese laid open application. Further, in the Japanese laid open application, the resulting sintered compact is a sintered compact of polycrystals of boron nitride having wurtzite structure only, while in the present invention, the sintered compact obtained under the temperature-pressure condition within the parallelogram EFGH shown in FIG. 2 is a sintered compact of polycrystals of boron nitride having both wurtzite structure and zincblende structure. Therefore, the above described sintered compact of the present invention has a particularly high hardness.

In the present invention, at least one of titanium boride, zirconium boride and hafnium boride is added to the starting wurtzite-structured boron nitride in an amount of 2–35% by weight based on the total amount of the boride and the boron nitride. When the amount of the boride is less than 2% by weight, the effect of the boride for suppressing the conversion of wurtzite-structured boron nitride to zincblende-structured boron nitride is too poor to form a sintered compact consisting mainly of boron nitride having wurtzite structure only or having both of wurtzite structure and zincblende structure. While, when the addition amount is more than 35% by weight, the resulting sintered compact is brittle.

Figure 3:
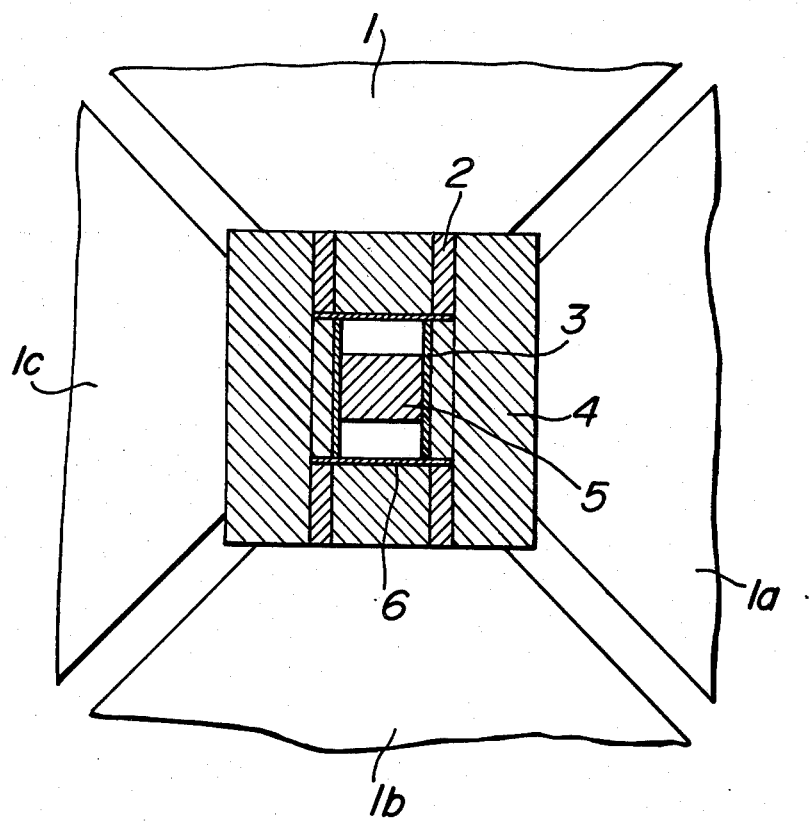
FIG. 3 is a cross-sectional view of a high temperature- and high pressure-generating part of a cubic anvil type high temperature and high pressure apparatus used for the production of the sintered compact of high density boron nitride according to the present invention.

Various kinds of high temperature and high pressure apparatus may be used for carrying out the method of the present invention. One embodiment of the apparatus is shown in FIG. 3. FIG. 3 is a cross-sectional view of the high temperature and high pressure generating portion of a cubic anvil type high temperature and high pressure apparatus.

This apparatus acts as follows. A space filled with a sample 5 is compressed by the relative movement of four anvils 1, 1a, 1b and 1c, and the pressure in the space becomes high. At the same time, a graphite heater 3 is energized to heat the sample 5 to a predetermined temperature. In FIG. 3, the numeral 2 represents an electroconductive ring, 4 represents pressure-transmitting medium made of pyrophyllite and 6 represents an electroconductive disk.

There are various types in the high temperature and high pressure apparatus, such as belt type, girdle type, piston cylinder type, tetrahydral anvil type and the like, in addition to the cubic anvil type. Any of these apparatus can be used in the present invention.

The pressure generated in the high temperature and high pressure apparatus can be measured in the following manner. A pressure, at which the electric resistance of bismuth, thallium, barium and the like, varies abruptly due to the phase transition thereof, is used as a standard point for calibrating pressure. From a relation between the load applied to the high pressure apparatus in order to generate pressure therein and the pressure-calibrating standard point, the actual pressure in the apparatus is indirectly measured.

The temperature of the sample was measured by inserting a thermocouple consisting of platinum and platinum-rhodium alloy into the sample room.

When the sintered compact of high density boron nitride produced by the method of the present invention was analysed by the X-ray diffractometry, it was found that the sintered compact obtained by the sintering under a temperature-pressure condition within the parallelogram ABCD hardly contained zincblende-structured boron nitride, and had a crystal structure substantially consisting of wurtzite structure, while the sintered compact obtained by the sintering under a temperature-pressure condition within the parallelogram EFGH had a mixed crystal structure consisting of wurtzite structure and zincblende structure. Further it was found that, when the addition amount of the boride was small, the boride was not detected in the form of the boride itself, and this fact suggests that the boride is dissolved into the boron nitride crystals. While, when the addition amount of the boride was large, the boride existed in the form of the boride itself. Even when the starting wurtzite-structured boron nitride is treated carefully, it is difficult to prevent the formation of a small amount of boric acid anhydride. It can be anticipated that oxide of titanium, zirconium or hafnium is formed during a treatment under a condition of high temperature and high pressure due to the reaction of boric acid anhydride and oxygen absorbed on the boron nitride crystal with boride of titanium, zirconium or hafnium, and a part of the above described oxide is dissolved into boron nitride. But, according to the result of the X-ray diffractometry, the amount of oxide of titanium, zirconium or hafnium is too small to be detected.

That is, it can be considered that the sintered compact of high density boron nitride obtained in the present invention consists mainly of sintered polycrystals of wurtzite-structured boron nitride or a sintered mixture of polycrystals of wurtzite-structured boron nitride and polycrystals of zincblende-structured boron nitride, and a part of boride of titanium, zirconium or hafnium previously added is dissolved into the boron nitride crystals, a part of the nitride is converted into oxide, and a major part of the boride exists among the crystal grains of wurtzite-structured boron nitride and zincblende-structured boron nitride in the form of boride.

In the present invention, since the sintered compact of boron nitride is produced by the sintering under a condition of very high temperature and pressure, existence of brittle boron nitride among boron nitride polycrystals in the sintered compact can be prevented, and the sintered compact has high compressive strength and hardness. Moreover, since the sintered compact contains boride of titanium, zirconium or hafnium, the compact has a very high oxidation resistance at high temperature in air, and further the growth of minute cracks (Griffis cracks) developed due to the rapid cooling from high temperature can be prevented by the region of boride of titanium, zirconium or hafnium. Therefore, the sintered compact can endure sudden change of temperature. This fact can be understood from the following observation. When a sintered compact consisting only of wurtzite-structured boron nitride, after being heated up to 1,100° C in air, is immersed in water, the cracks are formed on the whole surface of the sintered compact and the sintered compact becomes brittle. While, even when a sintered compact of high density boron nitride produced in the present invention, after being heated up to 1,100° C in air, is immersed in water, the formation of cracks which could be observed by the naked eye was not observed, and the decrease of the compressive strength of the compact is very small.

Further, the sintered compact of high density boron nitride obtained by the sintering under a condition of high temperature and high pressure within the parallelogram EFGH shown in FIG. 2 has a very high hardness. Moreover, the sintered compact has a high density, that is, has a density near the true density. For example, the density of the sintered compact is very close to its theoretical density calculated based on the density of boron nitride and the density of the added boride, and is at least 99% of the theoretical density. Further, even when the sintered compact is left to stand in water or air, the compressive strength thereof does not substantially decrease. This fact shows that the sintered compact has an excellent shelf stability.

As described above, the sintered compact according to the present invention can be used as a cutting tool, and a grinding material in the form of abrasive grain. Especially, a sintered compact of boron nitride prepared by this invention under a condition of temperature and pressure shown in FIG. 1 is effective for cutting metal having relatively rough surfaces, such as high-speed steel. A sintered compact of boron nitride prepared by this invention under a condition of temperature and pressure shown in FIG. 2 is effective for cutting hard metal, such as stellite, super alloy, etc., and has a good characteristic property for preservation.

The following examples are given for the purpose of illustration of this invention and are not intended as limitations thereof. In the examples, "parts" mean parts by weight.

EXAMPLE 1

Ninety parts of wurtzite-structured boron nitride obtained by the shock compression method and having a grain size of not larger than 2 μm was homogeneously mixed with 10 parts of titanium boride ($TiB_2$) having a purity of 99% and a grain size of less than 320 meshes by means of a ball mill, and the resulting mixture was preliminarily shaped into a cylinder having a diameter of 8 mm and a height of 6 mm and then subjected to a compression molding under a load of 1.5 ton/cm$^2$. The resulting molded article was set in a high pressure assembly and kept for 15 minutes under a temperature-pressure condition of 1,400° C and 58 Kb by means of a slide system cubic anvil type super high pressure apparatus to obtain a sintered compact consisting mainly of boron nitride. The boron nitride in the sintered compact consisted only of wurtzite-structured boron nitride. The sintered compact had a Vickers hardness of 3,000 kg/mm$^2$ and a compressive strength of 420 kg/mm$^2$.

EXAMPLE 2

A molded article obtained in the same manner as described in Example 1 was kept for 15 minutes under a temperature-pressure condition of 1,500° C and 68 Kb in the same apparatus as described in Example 1 to obtain a sintered compact consisting mainly of boron nitride. The boron nitride in the sintered compact consisted only of wurtzite-structured boron nitride. The sintered compact had a Vickers hardness of 5,500 kg/mm$^2$ and a compressive strength of 560 kg/mm$^2$.

EXAMPLE 3

A molded article obtained in the same manner as described in Example 1 was kept for 40 minutes under a temperature-pressure condition of 1,650° C and 75 Kb to obtain a sintered compact consisting mainly of boron nitride. The boron nitride in the sintered compact consisted only of wurtzite-structured boron nitride. The sintered compact had a Vickers hardness of 6,000 kg/mm$^2$ and a compressive strength of 600 kg/mm$^2$.

EXAMPLE 4

Eighty parts of wurtzite-structured boron nitride obtained by the shock compression method was homogeneously mixed with 20 parts of zirconium boride having a grain size of less than 320 meshes, and the resulting mixture was subjected to a compression molding in the same manner as described in Example 1. The resulting molded article was set in a high pressure assembly and kept for 10 minutes under a temperature-pressure condition of 1,600° C and 70 Kb to obtain a sintered compact consisting mainly of boron nitride. The boron nitride in the sintered compact consisted only of wurtzite-structured boron nitride. The sintered compact had a Vickers hardness of 2,900 kg/mm$^2$ and a compressive strength of 480 kg/mm$^2$.

EXAMPLE 5

Seventy parts of wurtzite-structured boron nitride was homogeneously mixed with 10 parts of titanium boride, 10 parts of zirconium boride and 10 parts of hafnium boride, all of the borides having a grain size of less than 320 meshes, and the resulting mixture was subjected to a compression molding in the same manner as described in Example 1. The resulting molded article was set in a high pressure assembly and kept for 5 minutes under a temperature-pressure condition of 1,600° C and 78 Kb to obtain a sintered compact consisting mainly of boron nitride. The boron nitride in the sintered compact consisted only of wurtzite-structured boron nitride. The sintered compact had a Vickers hardness of 4,500 kg/mm$^2$ and a compressive strength of 450 kg/mm$^2$.

COMPARATIVE EXAMPLE 1

Wurtzite-structured boron nitride powder obtained by the shock compression method was subjected to a compression molding in the same manner as described in Example 1 without the addition of the titanium boride. The resulting molded article was set in the same high temperature and high pressure apparatus as used in Example 1 and kept for 15 minutes under a temperature-pressure condition of 1,200° C and 68 Kb to obtain a sintered compact consisting only of boron nitride. The boron nitride in the sintered compact consisted only of wurtzite-structured boron nitride, but the sintered compact had a compressive strength of as low as 180 kg/mm$^2$.

COMPARATIVE EXAMPLE 2

Wurtzite-structured boron nitride powder obtained by the shock compression method was subjected to a compression molding in the same manner as described in Example 1 without the addition of the additive. The resulting molded article was kept for 10 minutes under a temperature-pressure condition of 1,600° C and 70 Kb to obtain a sintered compact consisting only of boron nitride. The boron nitride in the sintered compact consisted only of zincblende boron nitride. Cracks occurred in the sintered compact, and the compressive strength test of the sintered compact was not able to be carried out.

EXAMPLE 6

A molded article obtained in the same manner as described in Example 1 was set in a high pressure assembly and kept for 15 minutes under a temperature-pressure condition of 1,800° C and 65 Kb by means of a slide system cubic anvil type super high pressure apparatus, and then cooled to obtain a sintered compact consisting mainly of boron nitride. The analysis of the sintered compact by the X-ray diffractometry showed that the boron nitride in the sintered compact consisted of 50% of wurtzite-structured boron nitride. and 50% of zincblende-structured boron nitride. The sintered compact had a Vickers hardness of 6,800 kg/mm$^2$ and a compressive strength of 360 kg/mm$^2$.

EXAMPLE 7

A molded article obtained in the same manner as described in Example 1 was kept for 10 minutes under a temperature-pressure condition of 1,900° C and 75 Kb by means of a high pressure apparatus to obtain a sintered compact consisting mainly of boron nitride. The analysis of the sintered compact by the X-ray diffractometry showed that the boron nitride in the sintered compact consisted of 20% of wurtzite-structured boron nitride and 80% of zincblende-structured boron nitride. The sintered compact had a Vickers hardness of 7,200 kg/mm$^2$ and a compressive strength of 330 kg/mm$^2$. Even when the sintered compact was left to stand for 1 week in water at room temperature or left to stand for 1 month in air at room temperature, the sintered compact did not substantially change in its compressive strength and hardness.

EXAMPLE 8

To 80 parts of the same wurtzite-structured boron nitride as used in Example 1 was added 20 parts of zirconium boride, and the resulting mixture was subjected to a compression molding in the same manner as described in Example 1 to produce a molded article. The molded article was kept for 15 minutes under a temperature-pressure condition of 1,750° C and 68 Kb to obtain a sintered compact consisting mainly of boron nitride. The analysis of the sintered compact by the X-ray diffractometry showed that the boron nitride in the sintered compact consisted of 40% of wurtzite-structured boron nitride and 60% of zincblende-structured boron nitride. The sintered compact had a Vickers hardness of 5,600 kg/mm$^2$ and a compressive strength of 340 kg/mm$^2$. Even when the sintered compact was left to stand for 1 week in water at room temperature or left to stand for 1 month in air at room temperature, the sintered compact did not substantially change in its compressive strength and hardness.

EXAMPLE 9

A molded article was produced from a mixture of 80 parts of the same wurtzite-structured boron nitride as used in Example 1, 10 parts of titanium boride and 10 parts of zirconium boride in the same manner as described in Example 1, and kept for 15 minutes under a temperature-pressure condition of 1,800° C and 78 Kb to obtain a sintered compact consisting mainly of boron nitride. The analysis of the sintered compact of the X-ray diffractometry showed that the boron nitride in the sintered compact consisted of 70% of wurtzite-structured boron nitride and 30% of zincblende-structured boron nitride. The sintered compact had a Vickers hardness of 8,000 kg/mm$^2$ and compressive strength of 380 kg/mm$^2$. Even when the sintered compact was left to stand for 1 week in water at room temperature, the sintered compact did not substantially change in its compressive strength and hardness.

EXAMPLE 10

A molded article was produced from a mixture of 70 parts of the same wurtzite-structured boron nitride as used in Example 1, 10 parts of titanium boride, 10 parts of zirconium boride and 10 parts of hafnium boride in the same manner as described in Example 1, and kept for 15 minutes under a temperature-pressure condition of 1,980° C and 65 Kb to obtain a sintered compact consisting mainly of boron nitride. The analysis of the sintered compact by the X-ray diffractometry showed that the boron nitride in the sintered compact consisted of 15% of wurtzite-structured boron nitride and 85% of zincblende-structured boron nitride. The sintered compact had a Vickers hardness of 7,600 kg/mm$^2$ and a compressive strength of 280 kg/mm$^2$.

COMPARATIVE EXAMPLE 3

A molded article was produced from a mixture of 90 parts of the same wurtzite-structured boron nitride as used in Example 1 and 10 parts of titanium boride in the same manner as described in Example 1, and kept for 15 minutes under a temperature-pressure condition of 1,800° C and 55 Kb to obtain a sintered compact consisting mainly of boron nitride. The analysis of the sintered compact by the X-ray diffractometry showed that the boron nitride in the sintered compact had already been converted into graphite-structured low density boron nitride. The sintered compact was brittle and was able to be easily crushed by hand.

What is claimed is:

1. A method for producing a sintered compact consisting substantially of high density boron nitride having wurtzite structure, consisting of sintering a powdered mixture consisting of wurtzite-structured boron nitride obtained by the shock compression method and at least one of titanium boride, zirconium boride and hafnium boride, the amount of the boride being 2-35% by weight based on the total amount of the boride and the boron nitride, for 1-60 minutes under a temperature-pressure condition within a parallelogram formed by connecting points of A (1,400° C, 80 Kb), B(1,300° C, 55Kb), C (1,650° C, 55 Kb) and D(1,750° C, 80 Kb) in a temperature pressure diagram, under which conditions the boride functions to suppress conversion of the wurtzite crystal structure.

2. A method for producing a sintered compact consisting substantially of very high density boron nitride having both wurtzite structure and zincblende structure in a wide mixing ratio, at least about 15% being wurtzite structure, consisting of sintering a powdered mixture of wurtzite-structured boron nitride obtained by the shock compression method and at least one of titanium boride, zirconium boride and hafnium boride, the amount of the boride being 2-35% by weight based on the total amount of the boride and the boron nitride, for 1-60 minutes under a temperature-pressure condition within a parallelogram formed by connecting points of E (1,770° C, 80 Kb), F(1,700° C, 62 Kb), G (1,980° C, 62 Kb) and H(2,050° C, 80 Kb) in a temperature-pressure diagram.

3. The method of claim 2, wherein the sintered boron nitride compact has a density of at least about 99 percent of the theoretical density based on the density of the boron nitride and added boride in the initial mixture.

* * * * *